(12) United States Patent
Ming et al.

(10) Patent No.: US 8,730,167 B2
(45) Date of Patent: May 20, 2014

(54) POINTING DEVICE WITH OPTICAL POSITIONING ON LOW-DIFFUSIVE SURFACES

(75) Inventors: Hai Ming, Hefei (CN); Wei Huang, Hefei (CN); Jianping Xie, Hefei (CN); Huaqiao Gui, Hefei (CN); Tianpeng Zhao, Heifei (CN); Jun Xu, Hefei (CN); Yuan Kong, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1344 days.

(21) Appl. No.: 11/770,069

(22) Filed: Jun. 28, 2007

(65) Prior Publication Data
US 2009/0002347 A1  Jan. 1, 2009

(51) Int. Cl.
*G06F 3/033* (2013.01)
*G09G 5/08* (2006.01)

(52) U.S. Cl.
USPC ............................ 345/163; 345/157; 345/166

(58) Field of Classification Search
USPC .................... 345/156–158, 162, 166, 182
See application file for complete search history.

(56) References Cited

U.S. PATENT DOCUMENTS

| 5,212,535 | A  | * | 5/1993  | Miyazaki et al. ............... 356/28 |
| 6,256,016 | B1 | * | 7/2001  | Piot et al. ....................... 345/166 |
| 6,704,250 | B1 |   | 3/2004  | Ueyanagi .................... 369/13.33 |
| 6,741,234 | B2 |   | 5/2004  | Son .............................. 345/166 |
| 7,019,733 | B2 |   | 3/2006  | Koay ............................ 345/163 |
| 7,161,582 | B2 |   | 1/2007  | Bathiche et al. ............... 345/156 |
| 7,161,682 | B2 |   | 1/2007  | Xie et al. ....................... 356/520 |
| 7,321,359 | B2 | * | 1/2008  | Xie et al. ....................... 345/163 |
| 2002/0080117 | A1 | * | 6/2002  | Son et al. ....................... 345/163 |
| 2003/0142288 | A1 | * | 7/2003  | Kinrot et al. .................... 356/28 |
| 2004/0227954 | A1 |   | 11/2004 | Xie ................................ 356/498 |
| 2005/0231482 | A1 | * | 10/2005 | Theytaz et al. ............... 345/166 |
| 2006/0050058 | A1 |   | 3/2006  | Chu .............................. 345/166 |
| 2006/0214909 | A1 | * | 9/2006  | Poh et al. ....................... 345/156 |
| 2006/0256086 | A1 | * | 11/2006 | Xie et al. ....................... 345/166 |
| 2007/0013661 | A1 | * | 1/2007  | Theytaz et al. ............... 345/166 |
| 2007/0090279 | A1 |   | 4/2007  | Venkatesh .................... 250/221 |
| 2007/0291272 | A1 | * | 12/2007 | Itagaki .......................... 356/450 |
| 2009/0169069 | A1 | * | 7/2009  | Kim et al. ..................... 382/124 |

OTHER PUBLICATIONS

VCSEL, http://www.wave-report.com/tutorials/vcsel.htm, pp. 1-2, downloaded May 1, 2007.
IOGEAR GME227RW6 Wireless Laser Mouse with Nano Technology—Wireless—Laser—Mouse—3 x Button—1 x Scroll Wheel—USB, http;//www.keenzo.com/showproduct.asp?ID=844673, pp. 1-3, downloaded May 1, 2007.
"Optical Aberration," http://en.wikipedia.org/wiki/Aberration_in_optical$_{13}$ systems, retrieved from Wikipedia on Aug. 30, 2011.

\* cited by examiner

*Primary Examiner* — Matthew Fry
(74) *Attorney, Agent, or Firm* — Jeremy Snodgrass; Glen Johnson; Micky Minhas

(57) ABSTRACT

A computer input device includes a light source assembly forming an incident light beam that strikes an area on a surface beneath the input device with large incident angle. A light sensing assembly in the input device is positioned to receive scattered light and includes a band-pass filter. A barrier is located directly above the area where the light beam is incident on the top surface to prevent light from traveling directly from the light source assembly to the light sensing assembly.

14 Claims, 3 Drawing Sheets

POINTING DEVICE WITH OPTICAL POSITIONING ON LOW-DIFFUSIVE SURFACES

BACKGROUND

An optical pointing device tracks its movement across a surface by capturing light scattering patterns off the surface. For example, an image of the surface and/or a speckle field from the scattered light can be detected. Images of a surface include dark and light areas that are created by non-uniform scattering of the light due to the roughness of a surface. Speckle fields have dark and light areas that are generated through interference created when coherent light is scattered by a rough surface. The optical pointing device is able to identify relative x-y movements against the surface, e.g., using cross-correlation of consecutive patterns. These x-y shifts are then sent from the pointing device to a computer system to indicate the amount of movement in both the x direction and the y direction.

To generate the signals used in X-Y motion tracking, optical pointing devices typically include a light source such as a light emitting diode (LED) or a vertical cavity surface emitting laser (VCSEL) and an array of light sensors such as a Complementary Metal-Oxide-Semiconductor (CMOS) sensor. In the case of a light beam striking a typical working surface, there are generally two possible channels of light scattering off the surface if other possibilities such as absorption and transmission are excluded.

The first possible channel is known as specular reflection. This type of reflection follows the reflection law in which the angle of reflection equals the angle of incidence. Thus, if the angle of incidence is 45 degrees from the normal to the surface, the angle of the specular reflection will also be 45 degrees. Specular reflection tends to be stronger for surfaces that are relatively smooth and flat.

The second possible channel is known as diffusive scattering. Diffusive scattering is caused by roughness or debris on the surface. Diffusive scattering can scatter the light in many different directions. In the case of a VCSEL beam interacting with a surface, unique surface patterns can be generated by diffusive scattering both due to reflective imaging and due to speckle generation of the scattered light.

The optical pointing devices can work effectively on typical surfaces due to the roughness present on these surfaces, which generates sufficiently strong diffusively scattered light to produce desired patterns. As noted above, these patterns can be due to reflective imaging and/or speckle.

However, pointing devices do not perform well with extremely smooth surfaces, such as marble or glass, which often have very weak diffusively scattered light. As far as these surfaces are concerned under typical configurations in existing implementations of pointing devices, the majority of the light that is incident on them will be dominantly either reflected in the specular direction and/or, in the case of glass, transmitted through the surface. The diffusively scattered light is often too weak to generate a usable signal from reflective imaging and/or speckle, posing great challenges for using a pointing device on such surfaces.

The discussion above is merely provided for general background information and is not intended to be used as an aid in determining the scope of the claimed subject matter.

SUMMARY

A computer input device includes a light source assembly forming an incident light beam that strikes an area on a surface beneath the input device with a large incident angle. A light sensing assembly in the input device is positioned to detect the corresponding signal and includes a band-pass filter. A barrier is located directly above the area where the light beam is incident on the top surface to prevent any light from traveling directly from the light source assembly to the light sensing assembly.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
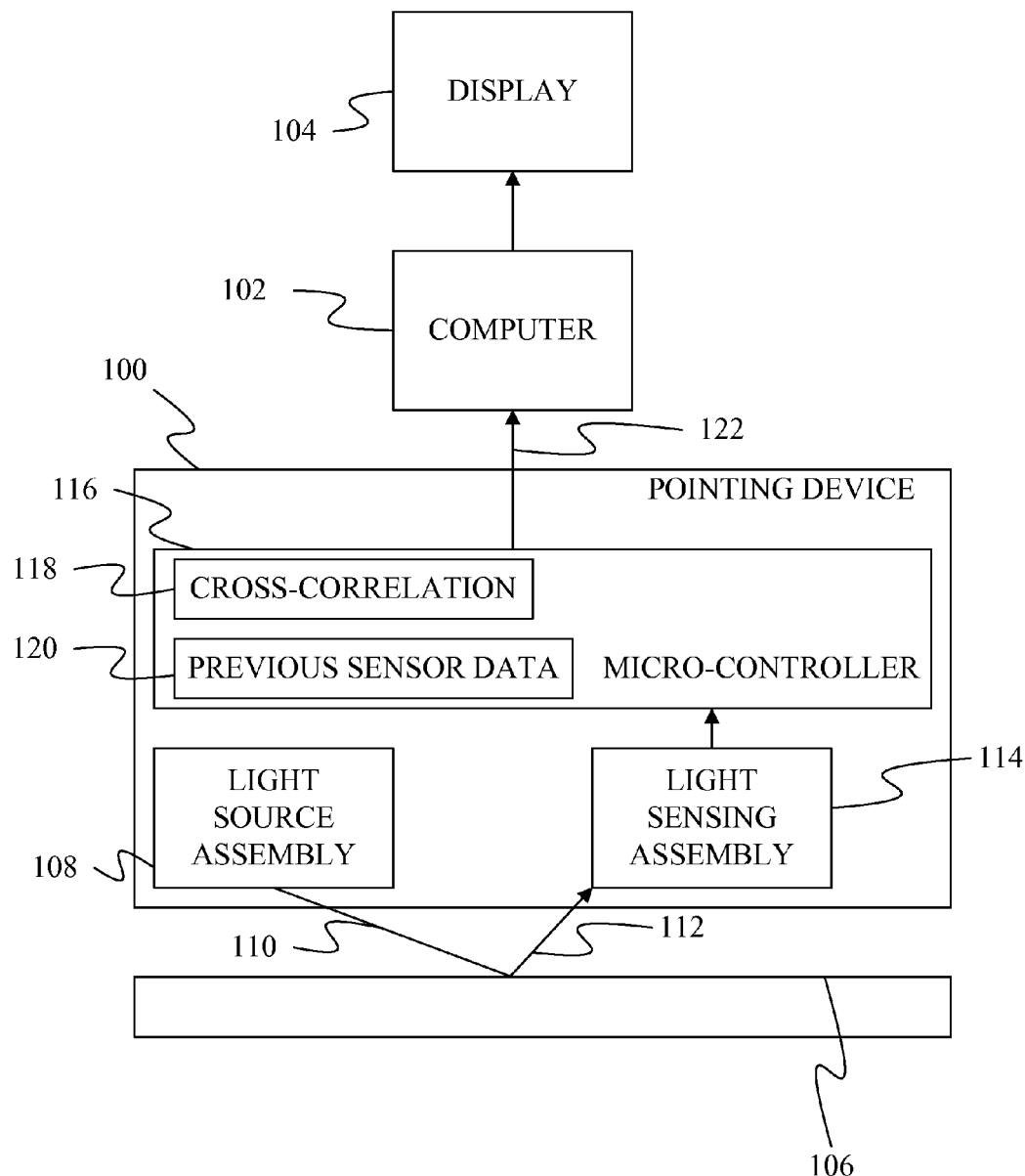
FIG. 1 is a block diagram of a pointing device and computing environment.

FIG. 1 provides a block diagram showing the relationship between a pointing device 100, a computer 102, a display 104 and a surface 106. Pointing device 100 includes a light source assembly 108, which shines an incident light beam 110 on surface 106 producing sufficient diffusively scattered light 112 that is captured by a light sensing assembly 114. Light source assembly 108 and light sensing assembly 114, as described more fully below, can include lenses and filters.

Under one embodiment, light sensing assembly 114 includes a grid of individual light sensors. Each sensor provides a digital value indicating the amount of light that strikes the sensor. The values for the grid are provided to a micro-controller 116 in pointing device 100. Micro-controller 116 uses a cross-correlation component 118 to compare the current sensor data from light sensing assembly 114 with previous sensor data 120, collected at a previous time. Based on this cross-correlation, micro-controller 116 is able to determine the amount of movement of pointing device 100 along the plane of surface 106. Based on the calculated movement, micro-controller 116 sends a pointing device message 122 to computer 102 indicating the change in position of pointing device 100 in the x direction and the y direction. Pointing device message 122 may also include information about the current state of one or more buttons on the pointing device and one or more rolling actuators.

Computer 102 uses the information in pointing device message 122 to control the position of one or more displayed objects on a display 104. In many applications, the information in pointing device message 122 is used to control the position of a caret on display 104.

Under embodiments described herein, surface 106 may be a low diffusive material such as marble or glass. For the purpose of convenience, in the description below, household glass (hereinafter referred as "glass") is used to represent a weak-diffusive surface. As those skilled in the art will recognize, such "household" glass includes imperfections that allow it to produce some diffusive scattering. High quality, optical grade glass that is perfectly smooth, on the other hand, does not produce such scattering and as such would not produce sufficient patterns for tracking.

Figure 2:
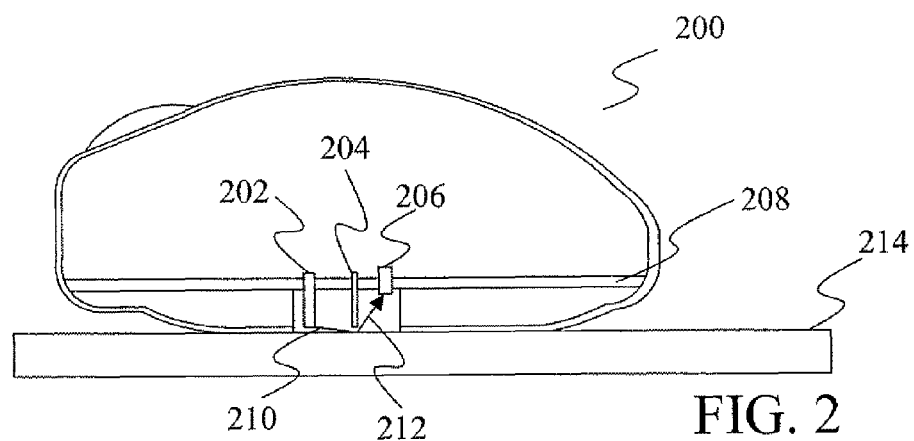
FIG. 2 is a cross-sectional side view of one embodiment of a pointing device.

FIG. 2 provides a cross-sectional side view of a pointing device 200 representing one embodiment of a pointing device. Pointing device 200 includes a light source assembly 202, a barrier 204 and a light sensing assembly 206, which are all supported on a printed circuit board 208. Light source assembly 202 produces incident beam 210, which is scattered off of top surface 214 to produce diffusively scattered light 212.

Figure 3:
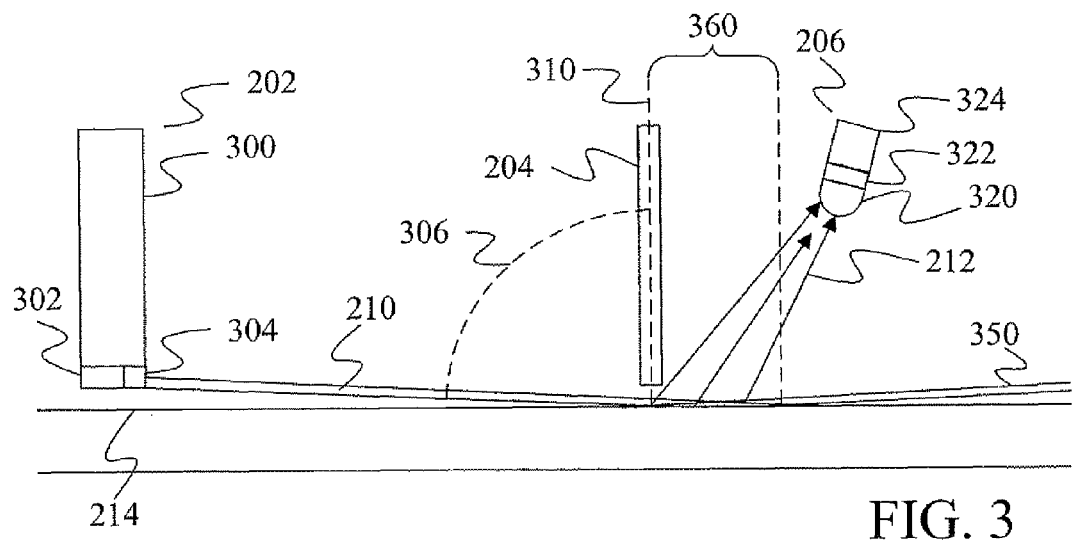
FIG. 3 is an expanded cross-sectional view of a high-incidence-angle embodiment.

FIG. 3 provides an expanded cross-sectional side view of light source assembly 202, barrier 204 and light sensing assembly 206 under one embodiment.

In FIG. 3, light source assembly 202 includes light support structure 300, light source 302 and collimating lens 304. Support structure 300 places light source 302 and collimating lens 304 at a position that produces an incident beam 210 that is at a high incidence angle 306 from a normal 310 to surface 214. Under some embodiments, this angle is arranged between 75° and 85° to create usable speckle signals formed by light scattered off top surface 214. Under one embodiment, light source 302 is a vertical cavity surface emitting laser (VCSEL), which is powered by electrical traces on support structure 300 from a connection to a power source on printed circuit board 208. Under such an embodiment, light beam 210 represents coherent collimated light. Light source 302 may also take the form of an edge emitting laser diode.

Barrier 204 is located in a space 360 directly above at least a portion of the area at which collimated beam 210 is incident upon top surface 214. Barrier 204 blocks any light originating from light source 302 and collimating lens 304 (e.g., due to diffraction) from being transmitted directly to light sensing assembly 206. This helps to minimize interfering background light contained in the acquired image and ensure that the light received by light sensing assembly 206 comes from light scattered off the surface 214 instead of directly from light source assembly 202.

Light sensing assembly 206 includes a collecting lens 320, a band-pass filter 322 and a sensor array 324. Under one embodiment, background light that is not associated with light source 302 is filtered by band-pass filter 322. In particular, band-pass filter 322 is chosen to allow light in a wavelength band centered around the wavelength of light source 302 to pass through to sensor array 324 while blocking light of other wavelengths from reaching sensor array 324. For example, if light source 302 consists of a vertical cavity surface emitting laser in the near IR wavelength of 850 nanometers, band-pass filter 322 will allow light in the range from 840 nanometers to 860 nanometers to pass through to light sensor array 324 but will block other wavelengths of light, such as visible light that can exist in the ambient environment and that can reach the detector through the sides and/or bottom of the glass. Band-pass filter 322 can be achieved with an optical coating on any component of the light sensing assembly 206 or may be provided as a separate component.

Light sensing assembly 206 can be positioned away from the specular reflection 350 direction, which may contain the specular beam as well as other possible interfering noises.

For weak diffusive surfaces, such as glass, the high angle of incidence reduces the amount of light transmitted through the glass surface and increase the proportion of scattered light that can reach the detection elements. It also minimizes any interfering signal generated by transmitted light scattering off the bottom of the glass surface or beyond. The speckle image captured by sensor array 324 is formed by the light predominantly scattered by top surface 214 and carries little information about the bottom surface of glass. Once the speckle field is obtained, tracking across the glass surface can be achieved through cross-correlation among other algorithms.

The incidence angle of 75° to 85° discussed above may be reduced by driving the light source with more current and/or by increasing the CMOS sensor's sensitivity. In addition, the range above is one example of many possible ranges. In other embodiments, the ranges can be 70° to 85°, 80° to 89° and 85° to 89°.

Figure 4:
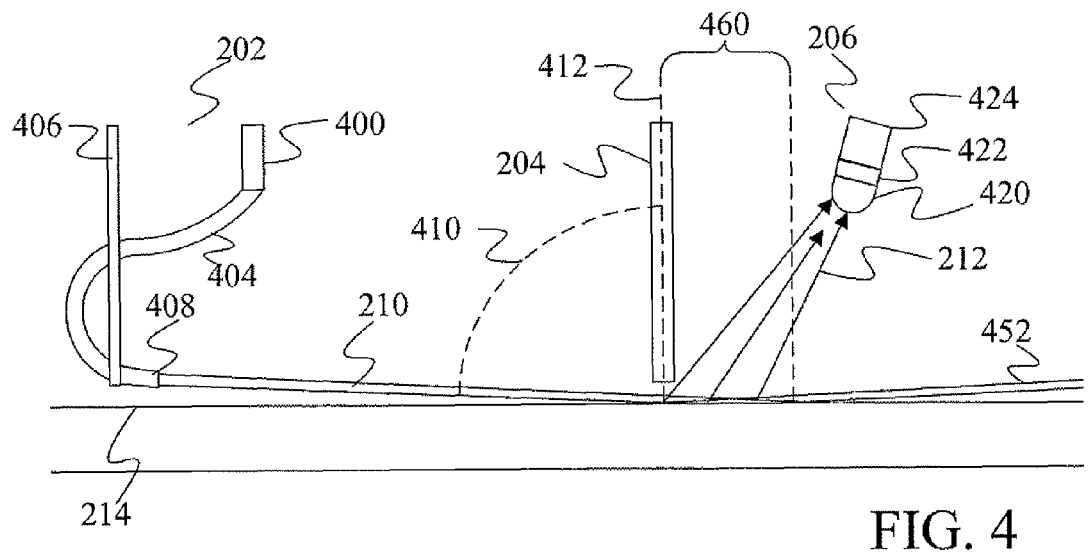
FIG. 4 is an expanded cross-sectional view of a second high-incidence-angle embodiment.

FIG. 4 provides an alternative embodiment of the high-incidence-angle optical pointing device of FIG. 2. In FIG. 4, light source assembly 202 consists of a light source 400, an optic fiber 404 and an optic fiber support structure 406. Light source 400 may take the form of a vertical cavity surface emitting laser, or an edge emitting laser diode. Optic fiber 404 guides light produced by light source 400 to an optic fiber end 408. Optic fiber support 406 holds optic fiber 404 so that end 408 of optic fiber 404 is positioned so as to provide an incident light beam 210 at a high angle of incidences 410 from a normal 412 of surface 214. Under one embodiment, the angle of incidence 410 is from 75° to 85°. The incident angle of 75° to 85° may be reduced by driving the light source with more current and/or by increasing the CMOS sensor's sensitivity. In addition, the range is one example of many possible ranges. In other embodiments, the ranges can be 70° to 85°, 80° to 89° and 85° to 89°. Under some embodiments, end 408 of optic fiber 404 includes a lens for forming a collimated beam of a desired shape.

As in FIG. 3, a barrier 204 is provided in a space 460 to prevent light from light assembly 202 from reaching light sensing assembly 206 directly.

In the embodiment of FIG. 4, light sensing assembly 206 includes a lens 420, a band-pass filter 422 and a light sensing array 424 that is similar to lens 320, band-pass filter 322 and light sensing array 324 of FIG. 3. In particular, band-pass filter 422 allows a band of wavelengths centered around the wavelength of light source 400 to pass to light sensing array 424 while preventing other wavelengths of light from reaching light sensing array 424. As in FIG. 3, the high angle of incidence of collimated beam 210 forms diffusive reflection 212 and specular reflection 452, wherein diffusive reflection 212 is received by lens 420 and is directed onto sensing array 424.

In FIG. 4, light sensing assembly 206 can be positioned away from the specular reflection direction, which contains the specular beam as well as other interfering noises.

To accommodate the small amount of light in diffusive reflection 212 that is received from weak-diffusive surfaces, e.g., glass surfaces while at the same time accommodating rougher surfaces, sensor arrays 324 and 424 must have a sensing range that can accommodate the differences in signals proportional to the amount of diffusively scattered light produced by the different surfaces.

Figure 5:
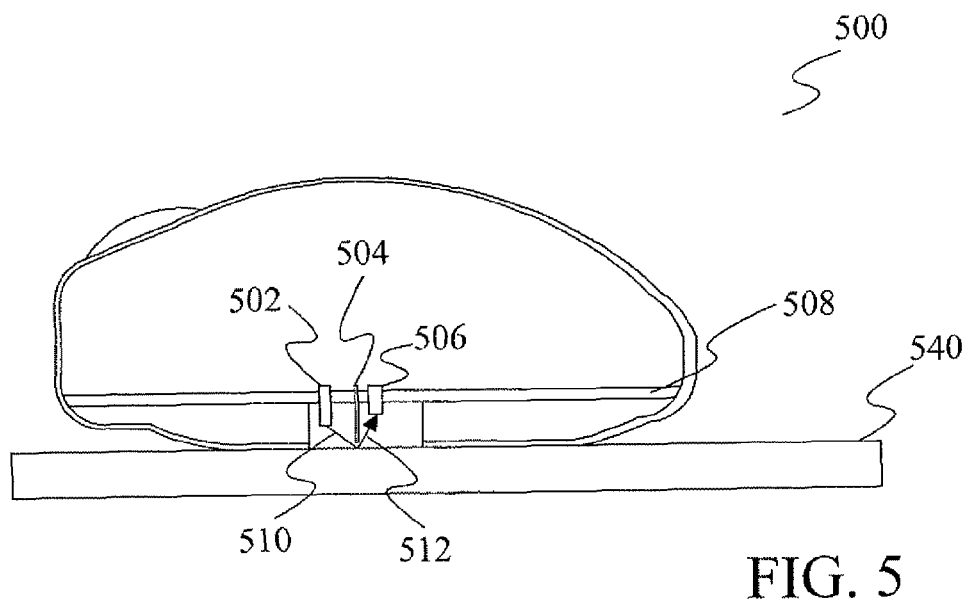
FIG. 5 is a cross-sectional side view of a pointing device under an additional embodiment.

FIG. 5 provides a cross-sectional side view of an additional embodiment of a pointing device 500. Pointing device 500 includes a light source assembly 502, a barrier 504 and a light sensing assembly 506 mounted on a printed circuit board 508. Light source assembly 502 provides an incident light beam 510, which produces diffusive scattering 512 from surface 540.

Figure 6:
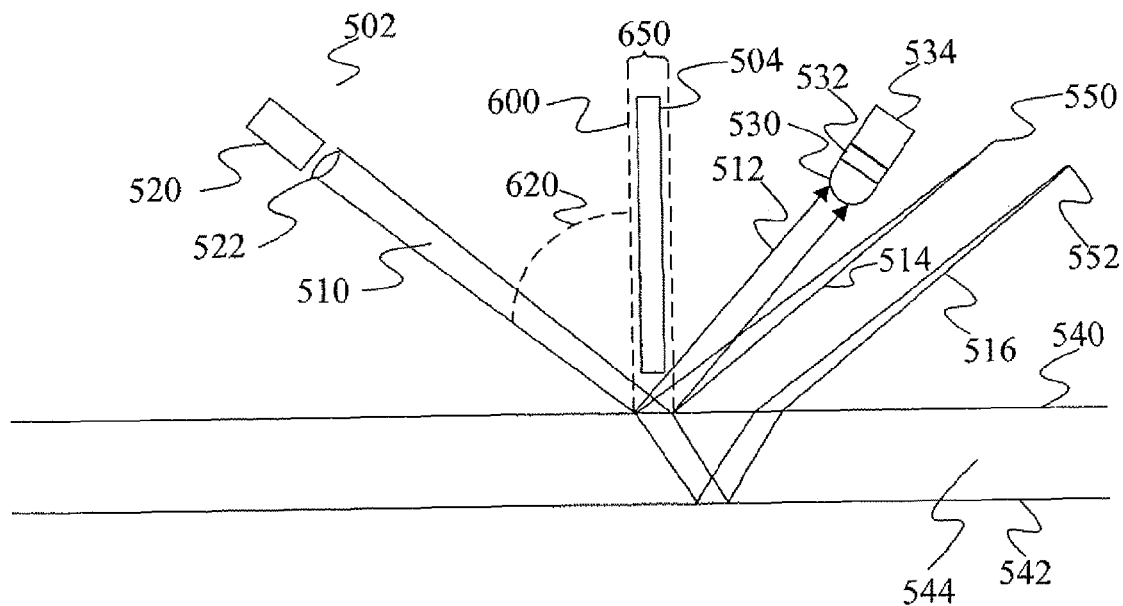
FIG. 6 is an expanded cross-sectional side view of optical elements of the embodiment of FIG. 5.

FIG. 6 provides an expanded view of light source assembly 502, barrier 504 and light sensing assembly 506 positioned over a glass sheet 544 having a top surface 540 and a bottom surface 542. Light source assembly 502 includes a light source 520 and a focusing lens 522, which produce light beam 510. Light source 520 may be a vertical cavity surface emitting laser, an edge emitting laser, or a light emitting diode, for example. Focusing lens 522 focuses the light produced by light source 520 to a focal point that would be below glass sheet 544.

In FIG. 6, incident beam 510 is at an incidence angle 620 to a normal 600 to surface 540. Incidence angle 620, under some embodiments, is 55° to 65°, which is smaller than the embodiments described above without the focusing lens 522. In other embodiments, the incidence angle may be increased to an angle such as that shown in FIGS. 3 and 4.

Incident light beam 510 reflects off of top surface 504 to produce a specular reflection 514 and diffusive scattering 512. Specular reflection 514 converges on a focal point 550. In addition, a portion of incident beam 510 passes through top surface 540 of glass 544 and is reflected off of bottom surface 542 to produce a second specular reflection 516 which converges at a focal point 552.

Focusing lens 522 helps to steer specular reflections 514 and 516 away from light sensing array 534. As a result, light sensing array 534 receives mostly diffusive scattering 512, which contains more information about surface 540 than is contained in specular reflections 514 and 516.

Diffusive scattering 512 is collected by a lens 530 and directed through a band-pass filter 532 to a light sensor array 534 in light sensing assembly 506. Light sensing assembly 506 is located between specular reflection 514 and a space 650 above the area where incident beam 510 strikes surface 540. Band-pass filter 532 allows wavelengths of light corresponding to the wavelengths of light produced by light source 520 to pass to light sensing array 534 while blocking other wavelengths of light. Under one embodiment, light source 520 produces light with a wavelength of 850 nanometers and band-pass filter 532 allows light from between 840 nanometers and 860 nanometers to pass to sensing array 534.

Barrier 504 is located directly above the area where beam 510 is incident on top surface 540. Barrier 504 prevents light from traveling directly from light source 520 and its assembly to light sensing assembly 506.

Although the embodiments have been described above with reference to computer mice, the embodiments are not limited to such computer input devices and may be applied to other computer input devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer input device comprising: a light source assembly forming an incident light beam that strikes an area on a top surface of a piece of glass beneath the input device at an angle between 75 and 85 degrees from a normal to the top surface, wherein a portion of the incident light beam is scattered by the top surface to form scattered light, a portion of the incident light beam is reflected by the top surface of the piece of glass to form a first specular reflection and a portion of the incident light is reflected by a bottom surface of the piece of glass to form a second specular reflection, wherein the light source further comprises a lens that focuses the incident light beam so that the first specular reflection from the top surface of the piece of glass converges on a first focal point and the second specular reflection from the bottom surface of the piece of glass converges on a second focal point;
a light sensing assembly that is positioned to receive light from the piece of glass, wherein the light sensing assembly is spaced from the specular reflections and is positioned between the specular reflections and a space directly above the area of the top surface where the incident light beam strikes the top surface, such that a majority of the received light comprises the scattered light from the top surface;
a light barrier in a space located directly above the area on the top surface where the incident light beam strikes the top surface, wherein at least a portion of the light barrier is located along a line extending directly between the light source assembly and the light sensing assembly so as to block light from traveling along the line from the light source assembly to the light sensing assembly; and
a printed circuit board to which the light source assembly, the light sensing assembly and the light barrier are mounted.

2. The computer input device of claim 1 wherein a band-pass filter allows a band of wavelengths of light to pass through the band-pass filter to reach a light sensing array and blocks wavelengths of light outside of the band, wherein the band of wavelengths includes the wavelength of the incident light beam.

3. The computer input device of claim 1 wherein the light source assembly comprises a light source and an optic fiber.

4. An optical pointing device for a computer system, the optical pointing device comprising:
a light source providing incident light, at a selected wavelength, that strikes an area of a glass surface at an angle between 75 and 85 degrees from a normal to the glass surface, such that a portion of the incident light is directed in a specular reflection, and a portion of the incident light is scattered by the glass surface;
a light sensor that converts light into electrical values, wherein the light sensor is spaced from the specular reflection and is positioned between the specular reflection and a space directly above the area of the glass surface that the incident light is incident upon such that a majority of the light captured by the light sensor to form an image comprises light scattered by the glass surface;
a band-pass filter located between the light sensor and the area of the glass surface that allows light with the selected wavelength to pass to the light sensor and that prevents wavelengths of light outside of a band of wavelengths from reaching the light sensor;
a barrier located in a space directly above the area of the glass surface where the incident light beam strikes the glass surface, wherein at least a portion of the barrier is located along a line extending directly between the light source and the band-pass filter, and prevents light from traveling along the line from the light source to the band-pass filter; and
a printed circuit board that supports the light source, the light sensor and the barrier.

5. An optical input device comprising:
a light source comprising a laser emitting light, an optical fiber guiding the light, and a lens at an end of the optical fiber opposite the laser, the lens being supported at the end of the optical fiber such that a beam of coherent incident light is formed at an angle between 75 and 85 degrees from a normal to a glass surface such that a portion of the incident light is directed in a specular reflection and a portion of the incident light is scattered by the glass surface;

a light sensor positioned in the optical input device to detect light diffusively scattered from the glass surface to produce an electrical signal wherein the light sensor is spaced from the specular reflection and is positioned between the specular reflection and a space directly above an area of the glass surface that the incident light is incident upon, such that a majority of the light captured by the light sensor to form an image comprises light scattered by the glass surface;

a barrier positioned in a space directly above the area of the glass surface where the incident light beam strikes the glass surface, wherein at least a portion of the barrier is located along a line extending directly between the light source and the light sensor, and prevents light from traveling along the line from the light source to the light sensor;

a printed circuit board that supports the light source, the light sensor and the barrier; and a microcontroller that uses the electrical signal to determine movement of the optical input device.

6. The optical input device of claim 5 further comprising a band-pass filter located between the light sensor and the surface that prevents light outside of a band of wavelengths from reaching the light sensor.

7. The optical device of claim 5 wherein the lens forms a collimated beam of light.

8. The optical device of claim 5, wherein the light source assembly comprises at least one of a vertical cavity surface emitting laser, an edge emitting laser, and a light emitting diode.

9. The optical device of claim 5, wherein the light sensing assembly comprises a grid of individual light sensors, each sensor providing a digital value indicating the amount of light that strikes the sensor.

10. The computer input device of claim 1, wherein the light sensing assembly is spaced away from the first and second specular reflections.

11. The computer input device of claim 1, wherein the light sensing assembly comprises a grid of individual light sensors, each sensor providing a digital value indicating the amount of light that strikes the sensor.

12. The computer input device of claim 1, wherein the light source assembly comprises at least one of a vertical cavity surface emitting laser, an edge emitting laser, and a light emitting diode.

13. The optical pointing device of claim 4, wherein the light source assembly comprises at least one of a vertical cavity surface emitting laser, an edge emitting laser, and a light emitting diode.

14. The optical pointing device of claim 4, wherein the light sensing assembly comprises a grid of individual light sensors, each sensor providing a digital value indicating the amount of light that strikes the sensor.

* * * * *